United States Patent
Kasai et al.

(10) Patent No.: US 6,802,703 B2
(45) Date of Patent: Oct. 12, 2004

(54) INJECTION UNIT OF ELECTRIC INJECTION MOLDING MACHINE

(75) Inventors: Toshihiro Kasai, Mishima (JP); Junsuke Kawai, Numazu (JP); Kazuhito Kobayashi, Numazu (JP); Makoto Nishizawa, Numazu (JP)

(73) Assignee: Toshiba Machine Co., Ltd., Tokyo (JP)

( * ) Notice: Subject to any disclaimer, the term of this patent is extended or adjusted under 35 U.S.C. 154(b) by 11 days.

(21) Appl. No.: 10/242,408

(22) Filed: Sep. 13, 2002

(65) Prior Publication Data

US 2003/0082268 A1 May 1, 2003

(30) Foreign Application Priority Data

Oct. 31, 2001 (JP) ........................................ 2001-335450

(51) Int. Cl.[7] .............................................. B29C 45/77
(52) U.S. Cl. ........................ 425/145; 425/567; 425/574
(58) Field of Search ................................ 425/145, 567, 425/574

(56) References Cited

U.S. PATENT DOCUMENTS 5,645,868 A * 7/1997 Reinhart .................... 425/145
6,309,203 B1 * 10/2001 Tamaki et al. .............. 425/145
6,364,650 B1 * 4/2002 Emoto ........................ 425/145

FOREIGN PATENT DOCUMENTS

JP 02052718 2/1990
JP 10-286848 10/1998

OTHER PUBLICATIONS

U.S. patent application Ser. No. 10/228,187, Kasai et al., filed Aug. 27, 2002.

* cited by examiner

Primary Examiner—Tim Heitbrink
(74) Attorney, Agent, or Firm—Pillsbury Winthrop LLP

(57) ABSTRACT

The tail end of a heating barrel is supported by a front plate. The tail end portion of a screw is rotatably supported by an intermediate plate. Bearings are built in the rear plate. The nut of each of ball screws is attached to the front surface of the rear plate through a hollow shaft and the bearing. Through holes are provided in the intermediate plate. To the front surface of the intermediate plate are fixed load cells so as to block the front of the through holes. The leading end portion of the threaded rod of each of the ball screws and leading end portion of the nut are inserted in each of the through holes. The leading end of the threaded rod is fixed to the rear surface of the load cell.

2 Claims, 3 Drawing Sheets

INJECTION UNIT OF ELECTRIC INJECTION MOLDING MACHINE

CROSS-REFERENCE TO RELATED APPLICATIONS

This application is based upon and claims the benefit of priority from the prior Japanese Patent Application No. 2001-335450, filed Oct. 31, 2001, the entire contents of which are incorporated herein by reference.

BACKGROUND OF THE INVENTION

1. Field of the Invention

The present invention relates to an injection unit of an electric injection molding machine, which is used to plasticize raw material resin and fill dies with the plasticized resin and, particularly, to the construction of a drive mechanism to advance a screw in a heating barrel.

2. Description of the Related Art

The construction of an injection unit in a conventional electric injection molding machine is described, for example, in Jpn. Pat. Appln. KOKAI Publication No. 10-286848 or Published Japanese Patent No. 2631521.

FIG. 2 shows, as an example of the construction of a conventional injection unit, the construction described in the Jpn. Pat. Appln. KOKAI Publication No. 10-286848. This injection unit comprises a heating barrel 1, a screw 2, a front plate 3, a rear plate 4, an intermediate plate 6, etc.

The heating barrel 1 is, on the leading end thereof (the left side in the drawing), connected to the rear surface of dies (not shown) through a nozzle (not shown). The screw 2 is incorporated in the heating barrel 1. The tail end of the heating barrel 1 is supported by the middle of the front plate 3. Behind the front plate 3 is arranged the rear plate 4 opposite to the front plate 3. Four tie bars 5 span the space between the front plate 3 and the rear plate 4, which are connected to each other through these tie bars 5.

Between the front plate 3 and the rear plate 4 is arranged the intermediate plate 6. Through holes are provided at four corners of the peripheral edge portion of the intermediate plate 6, and the tie bars 5 pass through these through holes. The intermediate plate 6 can move in a back-and-forth direction (a left-and-right direction in the figure) while being guided by the tie bars 5.

A bearing 7 is built in the middle of the intermediate plate 6 and the tail end of the screw 2 is supported by this bearing 7. Furthermore, a servomotor 9 for charging is placed on the intermediate plate 6. A pulley 8 is attached to the tail end portion of the screw 2. This pulley 8 is connected to the rotating shaft of the servomotor 9 through a timing belt.

Nuts 32 of ball screws are fixed in two places of the peripheral edge portion of the rear surface of the intermediate plate 6. Bearings 34 are built in two places of the peripheral edge portion of the rear plate 4, and the threaded rods 31 of the ball screws are supported by these bearings 34. The tail end portion of the threaded rod 31 of each ball screw protrudes from the rear surface of the rear plate 4 and a pulley 36 is attached to this portion. These pulleys 36 are connected to a servomotor for injection (not shown) through a timing belt. Moreover, in this example, a pressure sensor 35 to detect a reaction force that acts on the screw 2 during injection is attached to the middle of the rear surface of the intermediate plate 6.

In the injection unit, by rotating the screw 2 by use of the servomotor 9, a raw material resin is introduced into the heating barrel 1 and melted. Also, the molten resin is injected from the heating barrel 1 into the dies by driving the intermediate plate 6 by means of the ball screws 30 thereby to advance the screw 2 in the heating barrel 1.

In a case where, as in the example, the nut 32 of the ball screw is attached to the rear surface of the intermediate plate 6, the length of the nut 32 has a direct effect on the total length of the injection unit. That is, when the length of the nut 32 is increased, the total length of the injection unit also increases by this amount.

Incidentally, in an injection unit of an electric injection molding machine, high response is required during the control of the advance speed of the screw 2. Therefore, it is necessary to minimize the inertia of an axial driving mechanism of the screw 2 (generally, ball screws 30 are used as in the example). For this purpose, it is desirable to use ball screws of the smallest possible diameter.

On the other hand, in order to withstand the thrust during injection, it is necessary to increase the number of balls that transmit force between the threaded rod and the nut. In order to increase the number of balls, it is necessary to increase the number of turns and the number of rows. However, if this is carried out, the length of the nut increases. In order to shorten the length of the nut, it is necessary to increase the number of balls per perimeter by increasing the diameter of the threaded rod. However, if this is carried out, the inertia increases and the response during the acceleration and deceleration of the screw becomes worse.

Furthermore, in a case where, as in the example, means for detecting the back pressure of the screw 2 (the pressure sensor 35) is provided in addition to the ball screws 30 for the axial driving of the screw 2, it is impossible to individually detect the load of each of the ball screws 30. For this reason, when an excessive force acts on one ball screw, it is impossible to detect the abnormality and the ball screw may be broken early. Incidentally, in the described Published Japanese Patent No. 2631521, this problem is solved by inserting back-pressure detection means in the connection between the nut of each ball screw and the intermediate plate.

When the axial driving mechanism of the screw 2 is constituted by a plurality of ball screws 30, the axis of the screw 2 and the axis of each of the ball screws 30 are not on the same straight line, as shown in FIG. 3, and therefore bending moment acts on the intermediate plate 6, thereby generating deflection. Because this bending moment acts on the ball screws 30 as a lateral load, an excessive force acts on the balls kept between the nut 32 and the threaded rod 31, shortening the life of the ball screws 30.

To solve this problem, it is conceivable to decrease the amount of deformation of the intermediate plate 6 by increasing the rigidity of the intermediate plate. However, if the thickness of the intermediate plate 6 is increased, the total length of the injection unit also increases by this amount.

BRIEF SUMMARY OF THE INVENTION

The present invention was made in view of the problems with the injection unit of a conventional injection molding machine. The object of the invention is to provide an injection unit which enables the total length of the unit to be shortened, is excellent in response during the control of the advance speed of a screw, and has a long life of an axial driving mechanism of the screw.

The injection unit of an electric injection molding machine of the invention comprises: a heating barrel having a nozzle at the leading end thereof; a screw, the leading end side of which being incorporated in the heating barrel; a front plate supporting the tail end of the heating barrel; a rear plate arranged behind the front plate opposite to the front plate; tie bars spanning a space between the front plate and the rear plate and connecting both together; an intermediate plate arranged between the front plate and the rear plate, moving along the tie bars in a back-and-forth direction and rotatably supporting a vicinity of the tail end of the screw; a rotationally driving mechanism mounted to the intermediate plate and configured to rotate the screw; and ball screws mounted to the rear plate and configured to drive the intermediate plate in a back-and-forth direction. In this injection unit of an electric injection molding machine, the nut of each of said ball screws is rotatably attached to said rear plate, through holes are formed in said intermediate plate, the leading end portion of the threaded rod of each of said ball screws and the leading end portion of the nut are inserted in each of these through holes, and the leading end of the threaded rod is connected to the front surface side of said intermediate plate.

According to the injection unit of an electric injection molding machine of the invention, because the leading end portion of the nut of each of the ball screws is inserted in each of the through holes, it is unnecessary to increase the total length of the injection unit even in a case where the length of the nut is increased in order to increase the injection pressure. Furthermore, the thickness of the intermediate plate can be increased without increasing the total length of the injection unit. Therefore, it is possible to adopt the measure to increase the stiffness of the intermediate plate by increasing the thickness of the intermediate plate thereby to reduce the deflection of the intermediate plate. As a result, the bending moment acting on the ball screws can be minimized and the life of the ball screws can be extended.

Preferably, load cells are fixed to the front surface of the intermediate plate so as to block the front of the through holes and the leading end of each of the threaded rods is fixed to the rear surface of each of the load cells.

In this manner, by inserting a load cell in the connection between each of the threaded rods and the intermediate plate, it becomes possible to directly detect a load applied to each of the threaded rods. Furthermore, because the load cells are arranged on the front surface side of the intermediate plate, the total length of the injection unit does not increase due to the mounting of the load cells.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the embodiments given below, serve to explain the principles of the invention.

DETAILED DESCRIPTION OF THE INVENTION

Figure 1:
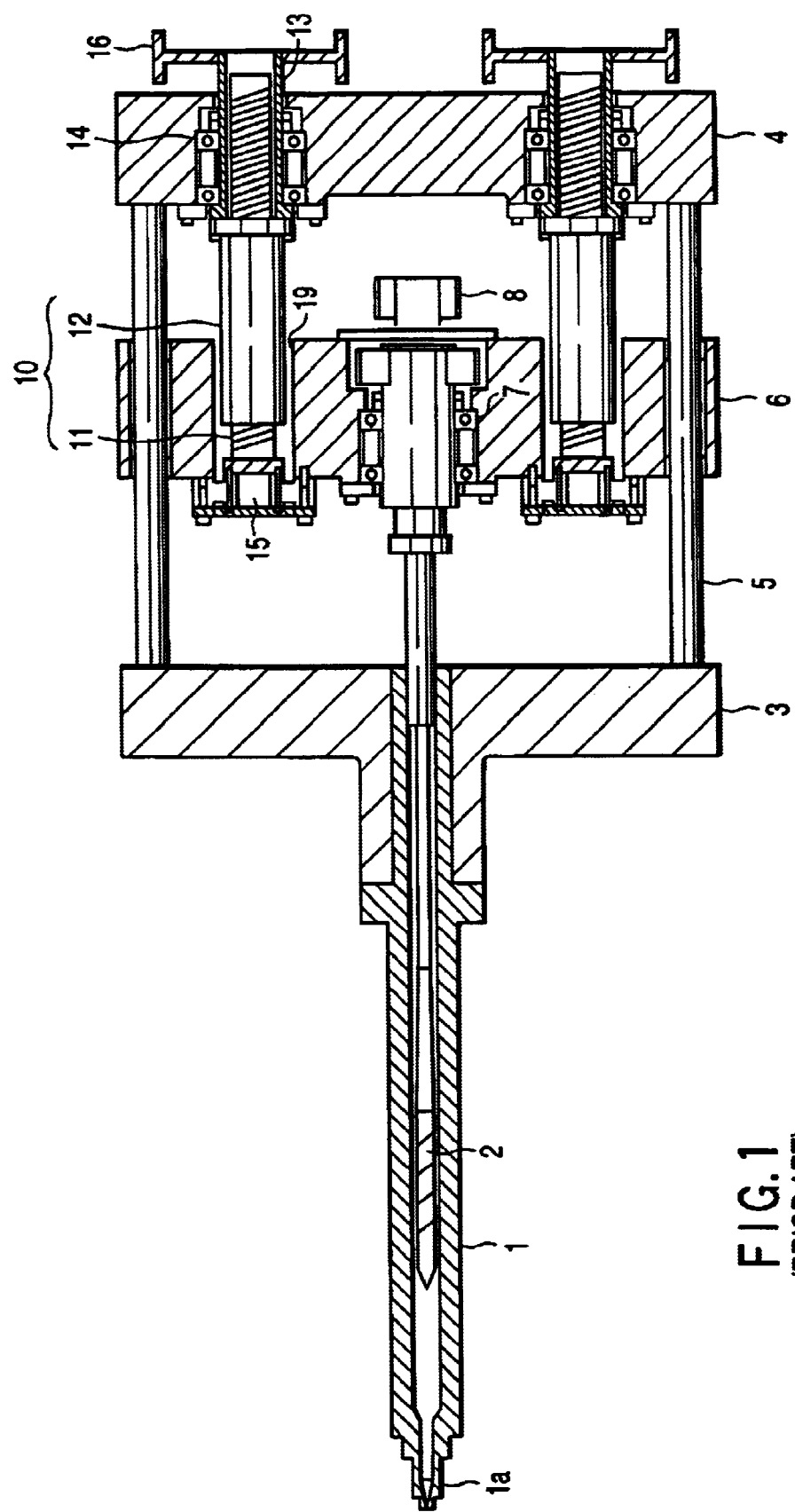
FIG. 1 is a view showing an outline of an injection unit according to the invention.
Figure 2:
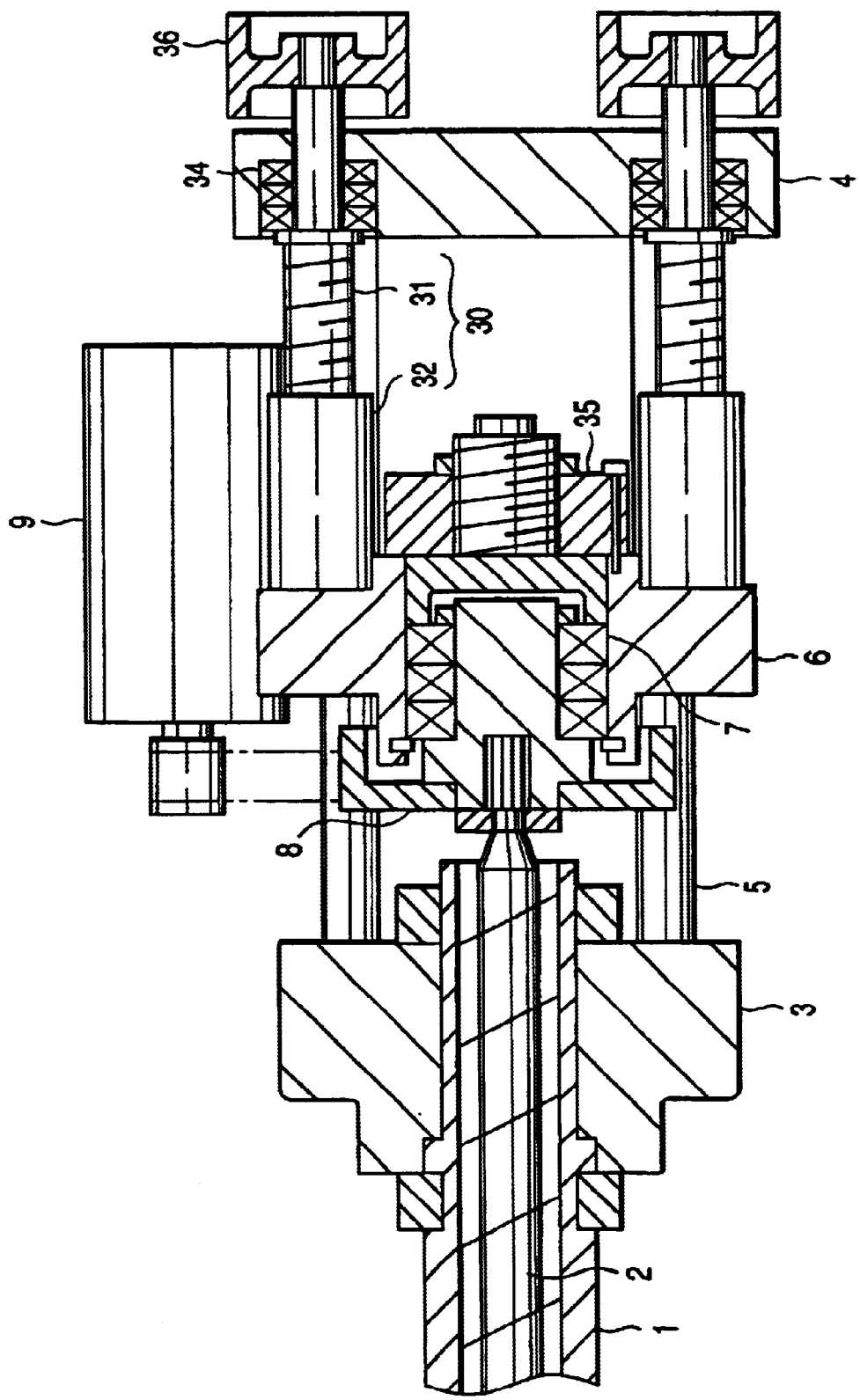
FIG. 2 is a view showing an example of a conventional injection unit.
Figure 3:
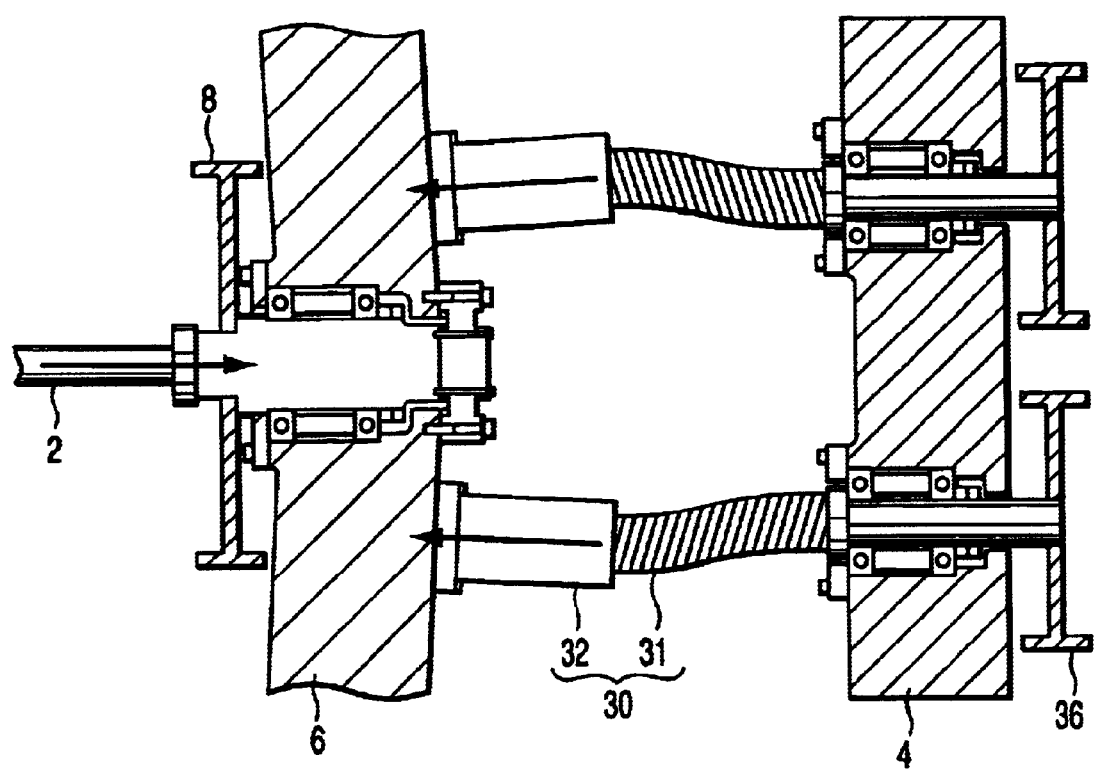
FIG. 3 is an explanatory diagram of the deformation of ball screws which occurs due to reaction force from a screw in the conventional injection unit.

FIG. 1 shows an example of an injection unit of an electric injection molding machine according to the invention. In the figure, the numeral 1 indicates a heating barrel, the numeral 2 a screw, the numeral 3 a front plate, the numeral 4 a rear plate, the numeral 5 a tie bar, the numeral 6 an intermediate plate, the numeral 10 a ball screw, the numeral 11 a threaded rod of the ball screw, the numeral 12 a nut of the ball screw, and the numeral 15 a load cell.

The heating barrel 1 is, at the leading end thereof (the left side in the drawing), connected to the rear surface of dies (not shown) through a nozzle 1a. The leading end side of the screw 2 is incorporated in the heating barrel 1. The tail end of the heating barrel 1 is supported by the middle of the front plate 3. Behind the front plate 3 is arranged the rear plate 4 opposite to the front plate 3. Four tie bars 5 span the space between the front plate 3 and the rear plate 4, which are connected to each other through these tie bars 5.

Between the front plate 3 and the rear plate 4 is arranged the intermediate plate 6. Through holes are provided at four corners of the peripheral edge portion of the intermediate plate 6, and the tie bars 5 pass through these through holes. The intermediate plate 6 can move in a back-and-forth direction (a left-and-right direction in the figure) while being guided by the tie bars 5.

A bearing 7 is built in the middle of the intermediate plate 6 and the tail end portion of the screw 2 is rotatably supported by this bearing 7. The tail end portion of the screw 2 protrudes from the rear surface of the intermediate plate 6 and a pulley 8 is attached to this portion. This pulley 8 is connected to the rotating shaft of a servomotor for charging (not shown) through a timing belt.

Bearings 14 are built in two places of the rear plate 4 corresponding to the inside of the connections with the tie bars 5. Nuts 12 of the ball screws are attached to the front surface of the rear plate 4 through the bearings 14 and hollow shafts 13. That is, the hollow shaft 13 is fixed to the tail end surface of each nut 12, and each hollow shaft 13 is supported by each bearing 14. The tail end portion of each hollow shaft 13 protrudes from the rear surface of the rear plate 4 and a pulley 16 is attached to this potion. Each pulley 16 is connected to a servomotor for injection (not shown) through a timing belt. The tail end of the threaded rod 11 of each ball screw protrudes from the tail end surface of the nut 12 and is housed in the hollow shaft 13.

Further through holes 19 are provided in two places of the intermediate plate 6 corresponding to the inside of the through holes through which the tie bars 5 pass. To the front surface of the intermediate plate 6 are fixed load cells 15 so as to block the front of the through holes 19. The leading end portion of the threaded rod 11 of each of the ball screws and leading end portion of the nut 12 are inserted in each of the through holes 19. The leading end of the threaded rod 11 is fixed to the rear surface of the load cell.

In the injection unit, by rotating the screw 2 by use of a servomotor (not shown), raw material resin is introduced into the heating barrel 1 and melted. Also, the molten resin is injected from the heating barrel 1 into the dies by driving the intermediate plate 6 by means of the ball screws 30 thereby to advance the screw 2 in the heating barrel 1. The reaction force acting on the screw 2 during the injection of the molten resin is detected by the load cells 15.

According to the injection unit of an electric injection molding machine of the invention, even when the length of the nut of the ball screw is increased in order to increase injection pressure, it is unnecessary to increase the total length of the injection unit. Furthermore, because the thickness of the intermediate plate can be increased without increasing the total length of the injection unit, a lateral load acting on the ball screws can be minimized and the life of the ball screws can be extended. In addition, because a high-load, small-diameter ball screws of large nut length can be used, it is possible to realize an injection unit which has small inertia and is excellent in response during the control of the advance speed of the screw.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An injection unit of an electric injection molding machine, comprising:

a heating barrel having a nozzle at the leading end thereof;

a screw, the leading end side of which being incorporated in the heating barrel;

a front plate supporting the tail end of the heating barrel;

a rear plate arranged behind the front plate opposite to the front plate;

tie bars spanning a space between the front plate and the rear plate and connecting both together;

an intermediate plate arranged between the front plate and the rear plate, moving along the tie bars in a back-and-forth direction and rotatably supporting a vicinity of the tail end of the screw;

a rotationally driving mechanism mounted to the intermediate plate and configured to rotate the screw; and ball screws mounted to the rear plate and configured to drive the intermediate plate in a back-and-forth direction;

wherein the nut of each of said ball screws is rotatably attached to said rear plate, through holes are formed in said intermediate plate, the leading end portion of the threaded rod of each of said ball screws and the leading end portion of the nut are inserted in each of these through holes, and the leading end of the threaded rod is connected to the front surface side of said intermediate plate.

2. The injection unit of an electric injection molding machine according to claim 1, wherein load cells are fixed to the front surface of said intermediate plate so as to block the front of said through holes and the leading end of each of said threaded rods is fixed to the rear surface of each of the load cells.

* * * * *